Aug. 13, 1963  O. V. GREUNKE  3,100,879
CAPACITANCE SENSING CIRCUIT
Filed May 8, 1959

INVENTOR.
ORVILLE V. GRUENKE
BY
ATTORNEY

7
United States Patent Office 3,100,879
Patented Aug. 13, 1963

3,100,879
CAPACITANCE SENSING CIRCUIT
Orville V. Greunke, Westport, Conn., assignor to United Aircraft Corporation, East Hartford, Conn., a corporation of Delaware
Filed May 8, 1959, Ser. No. 811,859
1 Claim. (Cl. 331—135)

My invention relates to a capacitance sensing circuit and more particularly to an improved capacitance sensing circuit which is extremely sensitive and which is especially adapted for use in devices requiring a digital output.

The usual capacitance sensing devices known in the prior art are not sufficiently sensitive that a very small change in capacitance will produce a significant change in the output signal from the device. Devices of the type known in the prior art which are constructed to be sensitive to small capacitance changes are complicated and expensive. The nature of the output of capacitance sensing devices of the prior art is such that these devices do not lend themselves to use in digital systems such, for example, as digital shaft position encoders.

I have invented a capacitance sensing circuit which is able to detect very small changes in capacitance. My circuit shifts from one to the other of a pair of widely differing states in response to a small change in capacitance to permit it to be used with digitally operating devices. My circuit is extremely rugged and simple for the high sensitivity of the circuit.

One object of my invention is to produce a capacitance sensing circuit which is extremely sensitive to very small changes in capacitance.

Another object of my invention is to provide a capacitance sensing circuit which is especially adapted for use in digitally operating devices.

A further object of my invention is to provide a capacitance sensing circuit which is extremely simple and rugged for the sensitivity of the circuit.

Other and further objects of my invention will be clear from the following description.

In general my invention contemplates the provision of a capacitance sensing circuit in which a capacitor assumes a first value to produce a positive feedback voltage which renders an electron device oscillating and assumes a second value to produce a negative feedback voltage which renders the device nonoscillating. In response to a very small change in capacitance, my circuit produces a sharp, pulse-like output which is especially suitable for digital applications.

In the accompanying drawings which form part of the instant specification and which are to be read in conjunction therewith and in which like reference numerals are used to indicate like parts in the various views.

Figure 1:
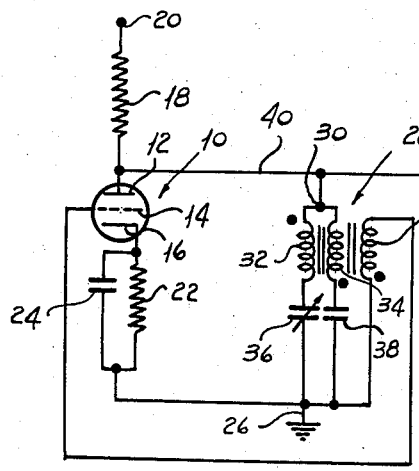
FIGURE 1 is a schematic view of a form of my capacitance sensing circuit employing a vacuum tube.

Referring now particularly to FIGURE 1 of the drawings, this form of my capacitance sensing device includes an electron tube, indicated generally by the reference character 10, having a plate 12, a grid 14, and a cathode 16. A plate resistor 18 connects the plate 12 to the terminal 20 of a suitable source of electrical potential. A cathode resistor 22, shunted by a by-pass capacitor 24, connects the cathode 16 to a conductor 26 connected to ground.

The feedback portion of my capacitance sensing circuit includes a transformer, indicated generally by the reference character 28, having a primary winding provided with a center tap 30 which divides the winding into two sections 32 and 34. I connect respective capacitors 36 and 38 between the terminals of sections 32 and 34 remote from the center tap 30 and ground conductor 26.

In the form of my invention shown, capacitor 38 may have a constant value $C_2$, while the capacitor 36 may be a variable capacitor having a value $C_1$. For example, the capacitor 36 could represent the capacitance between a pair of relatively movable elements in an analogue-to-digital shaft position encoder such, for example, as that shown in the copending application of Gruenke et al., Serial No. 71,543, filed November 3, 1958, for a multiphase analogue-to-digital converter. It will be appreciated also that variable capacitor 36 could represent the variable element of a capacitance measuring device, an insulation thickness gage, contactless limit switch, or the like.

I connect the center tap 30 to an output conductor 40 connected to the plate 12 of the tube 10. Transformer 28 includes a secondary winding 42 connected between the ground conductor 26 and the control grid 14 of tube 10. Conveniently, I select the transformer 28 to have a one-to-one transformation ratio.

To explain the manner in which my circuit functions, I will first consider the feedback portion of the circuit alone as having a voltage E at a frequency $\omega$ applied between center tap 30 and ground conductor 26. With this applied potential and with winding sections 32 and 34 each considered as having the same inductance value L, for the voltage $E_{L1}$ across the winding section 32, I may write:

(1) $$E_{L1} = \frac{\omega L E}{\omega L - 1/\omega C_1}$$

Similarly, for the voltage $E_{L2}$ across the winding section 34, I may write:

(2) $$E_{L2} = \frac{\omega L E}{\omega L - 1/\omega C_2}$$

Owing to the respective polarities of the winding sections 32 and 34 and of the secondary winding 42, the transformer algebraically subtracts the voltages across the respective primary winding sections to produce a voltage $E_{T1}$. It will be apparent that for this voltage I may write the expression:

(3) $$E_{T1} = E_{L1} - E_{L2} = \frac{\omega L E}{\omega L - 1/\omega C_1} - \frac{\omega L E}{\omega L - 1/\omega C_2}$$

or (4) $$E_{T1} = E \left[ \frac{KC_1}{KC_1 - 1} - \frac{KC_2}{KC_2 - 1} \right]$$

Figure 2:
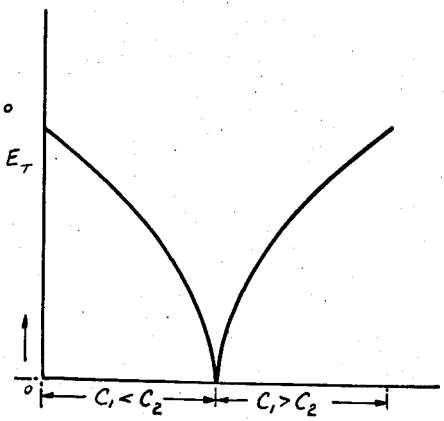
FIGURE 2 is a plot illustrating one characteristic of the feedback circuit of my capacitance sensing circuit.

From Equation 4 it can be seen that the relative values of the capacitors 36 and 38 having respective values $C_1$ and $C_2$ produce a voltage $E_{T1}$ of the nature shown in FIGURE 2. Clearly, if $C_1 = C_2$, $E_{T1} = 0$. For other relative values of the capacitors, the value of $E_{T1}$ will follow the curve shown in FIGURE 2.

Figure 3:
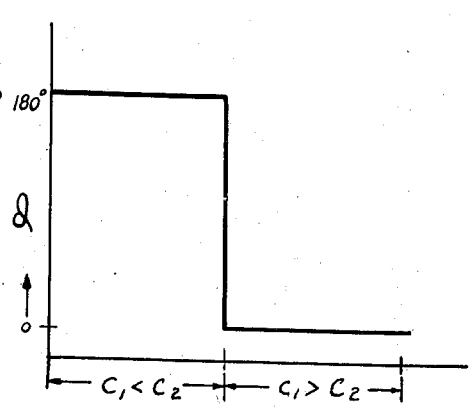
FIGURE 3 is a plot illustrating another characteristic of the feedback portion of my capacitance sensing circuit.

From the foregoing it will be apparent that if the value $C_2$ of capacitor 38 is greater than the value $C_1$ of capacitor 36, then the voltage across the winding section 34 will be greater than that across the winding section 32. I provide the winding sections 32 and 34 and the secondary winding 42 with polarities such that a negative feedback to the control grid 14 of tube 10 results when the value $C_1$ is less than $C_2$. In a form of my invention in which capacitor 36 is made up of a pair of relatively movable members, when these members are adjacent to each other, the capacitor has its greatest value. I so select the value of capacitor 38 that when these conditions prevail, $C_1$ is greater than $C_2$ and the circuit oscillates. As a result, the output voltage $E_o$ from the circuit rapidly rises to a maximum value to afford a digital indication of the relative values of the capacitors or, in one form of my circuit, the presence of one of a pair of relatively movable members adjacent the other of a pair of relatively movable members. I have indicated the relative phase of the feedback voltage for various relative values of the capacitors in FIGURE 3. It will be apparent that the phase of the feedback voltage for the condition in which $C_1$ is less than $C_2$ is 180° displaced from the phase of the feedback voltage when $C_1$ is greater than $C_2$.

Figure 4:
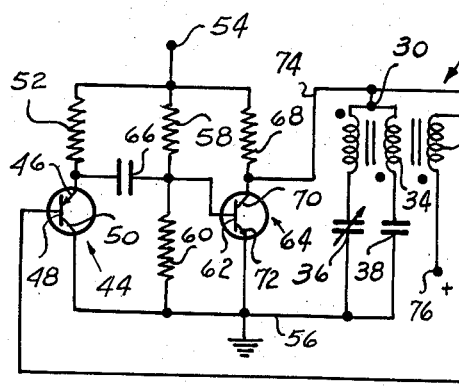
FIGURE 4 is a schematic view of an alternate form of my capacitance sensing circuit employing transistors.

Referring now to FIGURE 4 of the drawings, I have shown an alternate form of my invention including a p-n-p transistor, indicated generally by the reference character 44, having an emitter 46, a base 48, and a collector 50. A resistor 52 connects the emitter 46 to the terminal 54 of a suitable source of electrical potential. I connect the collector 50 to a ground conductor 56. I connect the common terminal of a pair of voltage dividing resistors 58 and 60, connected between terminal 54 and ground conductor 56, to the base 62 of a second n-p-n transistor, indicated generally by the reference character 64. Resistors 58 and 60 provide the proper bias for base 62. A capacitor 66 couples the emitter 46 of transistor 44 to the base 62. A resistor 68 connects the collector 70 to the terminal 54. I connect the emitter 72 of transistor 64 to conductor 56. A conductor 74 connects collector 70 to the center tap 30 of the transformer 28.

In this form of my invention I connect one terminal of the secondary winding 42 of transformer 28 to the terminal 76 of a suitable source of biasing potential. The remaining parts of the circuit shown in FIGURE 4 are the same as those of the circuit of FIGURE 1.

In operation of my capacitance sensing circuit in its normal condition, the capacitance $C_1$ of capacitor 36 is less than the capacitance value $C_2$ of capacitor 38 with the result that winding 42 applies a negative feedback voltage to the control element such as grid 14 or base 48 and the circuit does not oscillate. Thus $E_o$ has a relatively low value. When the value of $C_1$ exceeds that of $C_2$ as, for example, when a movable capacitor element is adjacent to a fixed capacitor element, the polarity of the feedback signal is the same as that of the input signal and the loop gain approaches unity to cause the circuit to oscillate. An extremely small change in the ratio of $C_1$ to $C_2$ causes oscillations to build up or to decay. In a practical circuit a change in capacitance as small as 0.025 micromicrofarad causes the circuit to change from its non-oscillating state to its oscillatory state.

It will be seen that I have accomplished the objects of my invention. I have provided a capacitance sensing circuit which is sensitive to extremely small changes in capacitance value. My system changes rapidly from a non-oscillating state to an oscillatory state to produce an output which is especially adapted for use in a digital device. My circuit is extremely simple and rugged for the high sensitivity it achieves. My circuit has a wide utility. For example, it may be used in a shaft position encoder as a capacitance measuring device, as an insulation thickness gage, as a contactless limit switch, and in many other applications.

It will be understood that certain features and subcombinations are of utility and may be employed without reference to other features and subcombinations. This is contemplated by and is within the scope of my claim. It is further obvious that various changes may be made in details within the scope of my claim without departing from the spirit of my invention. It is, therefore, to be understood that my invention is not to be limited to the specific details shown and described.

Having thus described my invention, what I claim is:

A capacitance sensing circuit including in combination a first capacitor having a first nominal capacitance value, a second capacitor having a second nominal capacitance value, at least one of the capacitors being variable from its nominal capacitance value, an amplifier having an input and providing an output, a transformer having a primary winding and a secondary winding, the primary winding having a first and a second terminal and a tap somewhere intermediate said terminals, means connecting the output of the amplifier to the tap, a source of fixed potential, means connecting the first capacitor between the first terminal and the source, means connecting the second capacitor between the second terminal and the source, and means connecting the secondary winding between the input of the amplifier and the source, the capacitors having such nominal capacitance values that the voltages at the primary winding terminals are equal and the secondary winding voltage is zero irrespective of the output voltage of the amplifier.

References Cited in the file of this patent

UNITED STATES PATENTS

| | | |
|---|---|---|
| 2,173,427 | Scott | Sept. 19, 1939 |
| 2,761,973 | Hodson | Sept. 4, 1956 |
| 2,764,643 | Sulzer | Sept. 25, 1956 |
| 2,894,211 | Bussard | July 7, 1959 |

FOREIGN PATENTS

| | | |
|---|---|---|
| 349,496 | Great Britain | May 22, 1931 |
| 353,627 | Great Britain | July 30, 1931 |